United States Patent
Vanberg

(10) Patent No.: US 6,932,545 B2
(45) Date of Patent: Aug. 23, 2005

(54) CUTTING INSERT FOR DRILLS HAVING CHIP-EMBOSSING FORMATIONS FOR STIFFENING CHIPS

(75) Inventor: Mattias Vanberg, Västerås (SE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 238 days.

(21) Appl. No.: 10/603,930

(22) Filed: Jun. 26, 2003

(65) Prior Publication Data

US 2005/0019116 A1 Jan. 27, 2005

(30) Foreign Application Priority Data

Jun. 26, 2002 (SE) .............................................. 0201966

(51) Int. Cl.[7] .............................................. B23B 27/22
(52) U.S. Cl. ........................ 407/114; 407/115; 407/116
(58) Field of Search ................................ 407/113, 114, 407/115, 116

(56) References Cited

U.S. PATENT DOCUMENTS

| | | | |
|---|---|---|---|
| 5,525,016 A | * | 6/1996 | Paya et al. .................. 407/116 |
| 5,630,681 A | * | 5/1997 | Paya ........................... 407/114 |
| 5,772,365 A | * | 6/1998 | Vogel et al. ................... 407/42 |
| 5,810,518 A | | 9/1998 | Wimn et al. |
| 6,447,218 B1 | * | 9/2002 | Lagerberg .................... 407/114 |
| 6,599,061 B1 | * | 7/2003 | Nelson ........................ 407/114 |

FOREIGN PATENT DOCUMENTS

| | | |
|---|---|---|
| EP | 0 941 796 | 9/1999 |
| JP | 10-263905 | 10/1998 |
| WO | WO 01/60554 | 8/2001 |

* cited by examiner

*Primary Examiner*—Willmon Fridie, Jr.
(74) *Attorney, Agent, or Firm*—Burns, Doane, Swecker & Mathis, LLP

(57) ABSTRACT

A cutting insert, intended for drills, in particular long hole drills, includes a cutting edge from which a concavely curved, chip removing surface extends up to a ridge where the curved surface transforms into a top side of the cutting insert. A number of long narrow chip-embossing formations (e.g., grooves or beads) extend from the chip removing surface to the top side with the purpose of producing, in the underside of the chip, long narrow embossments in the form of either ridges or flutes in order to stiffen the chip and make it more prone to breakage.

25 Claims, 2 Drawing Sheets

CUTTING INSERT FOR DRILLS HAVING CHIP-EMBOSSING FORMATIONS FOR STIFFENING CHIPS

This application claims priority under 35 U.S.C. §§ 119 and/or 365 to patent application Ser. No. 0201966-9 filed in Sweden on Jun. 26, 2002 the entire content of which is hereby incorporated by reference.

BACKGROUND OF THE INVENTION

This invention relates to a cutting insert, intended for drills, of the type that comprises a cutting edge from which a concavely curved, chip removing surface extends up to a ridge, where the curved surface transforms into a top side of the cutting insert. The invention also pertains to a method of chip-forming drilling.

When drilling in workpieces of, for instance, metal, there is a general desire that the chips cut free should be as short as possible in order to be evacuated from the hole being produced in the easiest conceivable way. If the chips become long, like a lock of curly hair, a risk of chip jamming arises. These difficulties become particularly marked in connection with long hole drilling in materials that form long chips, i.e., sticky or soft metals. Examples of metals that form long chips are steel with low carbon content and so-called duplex materials ("duplex" is used as a comprehensive term by those skilled in the art for different types of stainless materials that are particularly difficult to machine). By "long hole drilling" is usually understood drilling of holes the length of which is at least 5 or 10 times larger than the diameter (in extreme cases, the hole length may amount to more than 100 times the diameter). Long hole drilling may be carried out with many different types of drills, which however have in common that they, in addition to a drill head having replaceable cutting inserts, include a tubular shank, through which a cooling and/or lubricating medium may be led up to the drill head and then be transported away along with the separated chips. The supply of cooling/lubricating medium, as well as the evacuation of the same along with the chips, may be taken care of according to many different techniques that have been developed for decades. In all types of long hole drills, however, the channels for the chip evacuation are long and narrow. This means that there is a great risk of chip jamming if the chips, which are cut free, become too long.

Previously known cutting inserts for long hole drills of the above-related kind have without exception, been made with smooth chip removing surfaces, i.e., the concavely curved surface that extends from the cutting edge up to the back where the chip removing surface transforms into the top side of the cutting insert has always, in all essentials, been even and smooth. This means that the separated chip, irrespective of thickness (i.e., independent of the feeding in question) has been of uniform thickness with a smooth bottom side. That characteristic has turned out to aggravate (resist) the breaking of the chip into shorter pieces. Furthermore, the cooling liquid has problems traveling under the chip to reach the cutting edge.

SUMMARY OF THE INVENTION

The present invention aims at obviating the above-mentioned shortcoming of previously known drill cutting inserts and at providing an improved cutting insert for drills, in particular long hole drills. Therefore, a primary aim of the invention is to provide a cutting insert that in connection with the chip removing guarantees breaking of the chip into short pieces. Another aim is to provide a cutting insert with improved cooling/lubrication at the cutting edge region of the cutting insert.

The invention is based on the realization that a smooth chip removing surface on the cutting insert generates a chip of uniform thickness having a smooth bottom side, which means that the chip during the cooling thereof after the actual separation at the cutting edge preserves a softness that counteracts and delays breaking of the same. By forming the chip removing surface in accordance with the invention with one or more long narrow formations in the form of either grooves or beads that function to emboss ridges or flutes, respectively, in the bottom side of the chip, the softness of the chip is reduced, whereby breaking comes into effect faster. More precisely, tests, which have been performed, have shown that the chip is stiffened by the embossments and in this way, fracture-initiating units are created more rapidly in the chips, which result in chip breakage.

BRIEF DESCRIPTION OF THE DRAWINGS

The objects and advantages of the invention will become apparent from the following detailed description of preferred embodiments thereof in connection with the accompanying drawings and in which like numerals designate like elements.

DESCRIPTION OF PREFERRED EMBODIMENTS OF THE INVENTION

Figure 1:
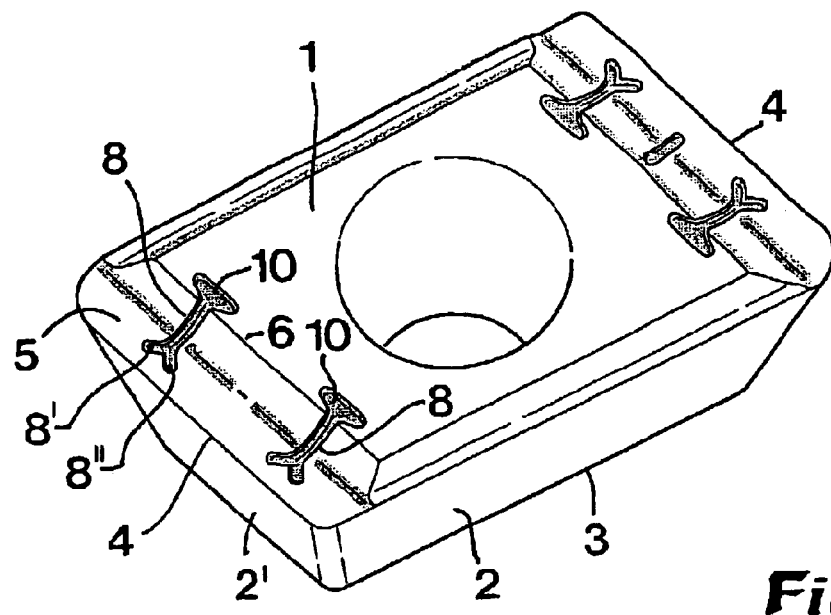
FIG. 1 is a perspective view of a cutting insert according to the invention, seen obliquely from above.
Figure 4:
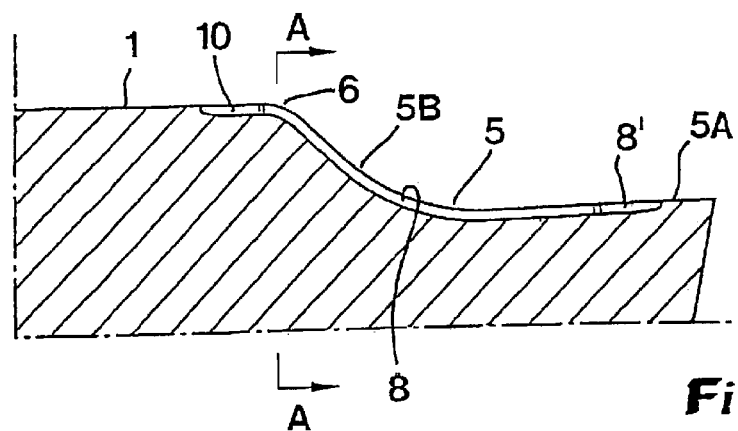
FIG. 4 is a highly enlarged detailed section showing the chip removing surface of the cutting insert and a embossment formation formed in the same in the shape of a groove.

In FIG. 1, a cutting insert intended for drills, in particular long hole drills, is shown, which in the usual way has a topside 1, a circumferential side surface 2 and a bottom side 3. In the illustrated example, the cutting insert includes two cutting edges 4, each of which is formed individually in connection with a clearance surface 2' that constitutes a portion of the circumfering side surface 2. From the individual cutting edge 4, a chip removing surface 5 extends up to a back edge and forms therewith a ridge 6, where the chip removing surface transforms into the topside 1 of the cutting insert. As is seen most clearly in FIG. 4, the chip removing surface 5 has a generally concavely curved shape. The actual surface as such is smooth and in the example includes on the one hand an approximately planar surface portion 5A adjacent to the cutting edge 4, and on the other hand a softly rounded surface portion 5B that extends like an inclined slope from the partial surface portion 5A to the ridge 6. When the cutting edge 4 enters a workpiece (while the cutting insert mounted on a drill head rotates), a chip (not shown) is separated that slides forth along the surface 5 up to the slope-like surface portion 5B, where the chip leaves the cutting insert from the ridge 6. In this connection, the chip is initially very hot as it leaves the cutting edge and is gradually cooled off during the transportation thereof backwards towards the ridge 6. Cooling of the chip is carried out by means of a cutting medium or fluid that is generally sprayed or flushed forwards towards the cutting edge, i.e., from the left to the right in FIG. 4, by a conventional nozzle arrangement, not shown.

Figure 2:
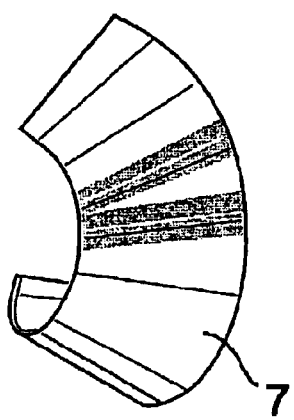
FIG. 2 is a schematic perspective view of a metal chip, which has been produced by a conventional cutting insert having a customary smooth chip removing surface.

As far as the shown cutting insert has been described hitherto, the same is previously known. In previously known cutting inserts, the chip removing or chip breaking surface 5 has been smooth along the entire extension thereof from the cutting edge 4 to the ridge 6 (i.e., the direction of chip elongation). This results in the separated chip receiving a shape according to FIG. 2, i.e., the bottom side 7 of the chip becomes smooth.

Figure 3:
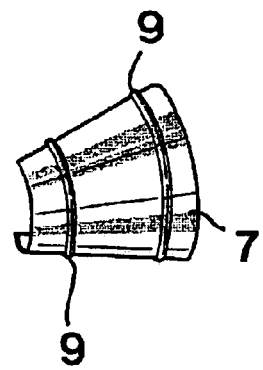
FIG. 3 is a corresponding perspective view showing a chip, which has been produced by means of the cutting insert according to the invention according to FIG. 1.

According to the present invention, a suitable number of long narrow formations 8 are formed in the surface 5 (preferably identical and parallel) having the purpose of supplying the separated chip with corresponding long narrow embossments in the direction of chip elongation with the purpose of facilitating and hastening breaking of the chip. In the preferred embodiment example that is visualized in FIGS. 1, 4 and 5, said embossing formations 8 comprise respective grooves that serve to emboss protruding ridges 9 on the bottom side 7 of the chip, as is shown in FIG. 3.

The individual shape and dimensions of the groove 8 may vary, per se, within fairly wide limits. However, the groove should always be long and narrow, i.e., have a length that is greater than the width thereof. Along the major portion of the length thereof, the groove is located in the area of the chip removing surface 5. Thus, the front end of the groove, facing the cutting edge 4, is located fairly near the cutting edge, whereas the rear portion of the groove extends up to and past the ridge 6. Thus, the rear end of the groove is located comparatively near the ridge 6. Therefore, when the hot and still plastically-formable chip slides along the chip removing surface 5, the chip's bottom side is pressed down into the groove so that a ridge 9 is formed on the bottom side of the chip. The forming of the ridge 9 in the individual groove is initiated as early as in the area of the front end of the groove, in order to be completed as the chip is moved backwards/upwards along the "slope" 5B of the chip removing surface. After this, the ridge 9 can pass the ridge 6 unresistingly thanks to the fact that the groove extends not only along the proper chip removing surface 5, but also through the ridge 6 and into the top surface 1 in which the groove forms a countersink 10. In other words, the shape of the ridge 9 is preserved when the chip comes clear from (separates from) the cutting insert.

In addition to forming ridges in the chip, the grooves 8 have another advantageous function viz to improve the cooling of the cutting insert in the area of the cutting edge and the chip removing surface. The presence of the grooves ensures that the cooling liquid penetrates further under the chip than on conventional cutting inserts as the cooling liquid is flushed or sprayed from behind under the chip in the forward direction towards the edge of the cutting insert. In order to amplify this liquid penetration effect, the individual groove has, according to the preferred embodiment of the invention, been formed so that the rear end thereof ports in the countersink 10, located in the topside 1, which is wider than the rest of the groove. At the opposite front end thereof, the groove 8 branches off in at least two partial grooves 8', 8" each extending at an acute angle forwards from the main groove. In spite of the fact that the individual groove guarantees embossment of a ridge on the bottom side of the chip, the cooling medium sprayed in from behind may form a cooling and lubricating film (usually in gasified form), which may reach up to the branches 8', 8" and be distributed laterally towards different portions of the cutting edge.

Figure 5:
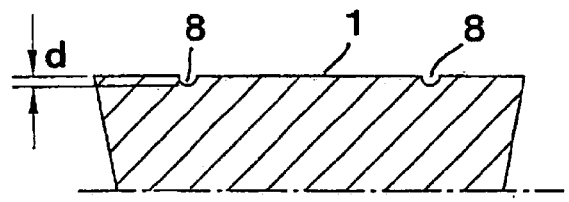
FIG. 5 is a section taken along line A—A in FIG. 4.

The geometrical cross-section shape of the individual groove 8 is not critical for the invention. However, the groove may advantageously have a semicircular cross section, as is shown in FIG. 5. The depth d of the groove should amount to at least 0.05 mm, suitably at least 0.08 mm. However, the depth of the groove should not exceed 0.15 mm and should suitably amount to at most 0.12 mm. In practice, a groove depth of about 0.10 mm is preferred. In this connection, it should be pointed out that the countersink 10 may have a greater depth than the actual groove 8, although the countersink and the groove in the example have been shown with the same depth.

The minimum width of the groove is preferably in the range 0.10–0.16 mm, with a maximum width preferably in the range 0.24–0.30 mm, a suitable width being 0.16 mm.

Figure 6:
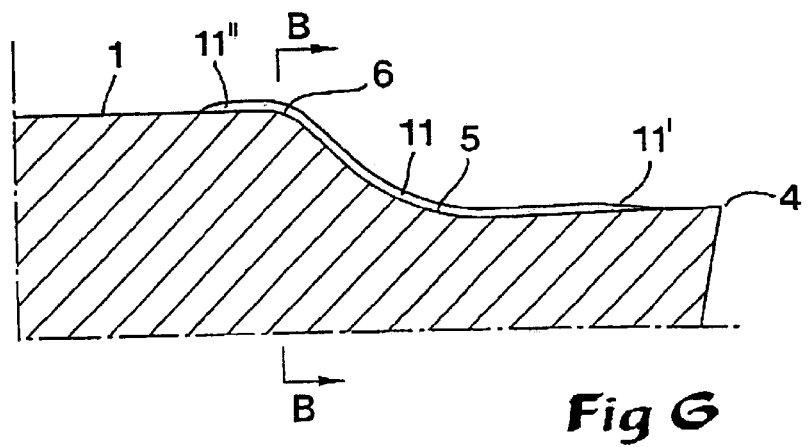
FIG. 6 is a section corresponding to FIG. 4, showing an alternative embodiment of the embossment formation, more precisely in the shape of a bead.
Figure 7:
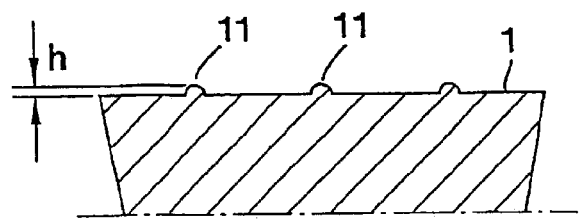
FIG. 7 is a section taken along line B—B in FIG. 6.

Reference is now made to FIGS. 6 and 7 showing an alternative embodiment of a cutting insert according to the invention. In this case, the embossing formations have the shape of beads 11 which function to emboss flutes, instead of ridges, in the bottom side of the chip. As is seen in FIG. 6, the individual bead has approximately the same length and location as the previously described groove 8. Thus, a front, tapering end 11' of the bead is located comparatively near the edge 4, and then the bead travels rearwardly across the chip surface 5, past the ridge 6 and is terminated by a short rear end portion 11" on the top side 1. As is seen in FIG. 7, the beads 11 (analogously to the grooves 8) may have a semi-circular cross-section shape and a height h corresponding to the depth measurements d mentioned above for the grooves. Also, the width of the beads can correspond to the above-mentioned width of the grooves.

The flutes or flute-like depressions that are embossed into the bottom side of the chip by the beads 11 weaken the chip in the area of the flutes at the same time as the chip sections between the same are stiffened. In this way, the breaking of the chip is facilitated.

It should be noted that the number of chip-embossing formations in the form of beads 11 in the embodiment according to FIG. 7 amounts to three instead of two, as has been shown in the embodiment according to FIGS. 1 and 5. Thus, the number of embossing formations in the shape of beads and grooves, respectively, may vary. On small cutting inserts, the individual cutting edge may interact with merely one single embossing formation. On very large cutting inserts, the number of embossing formations may be considerably greater than three.

Although the cutting insert according to the invention is particularly suited for use in long hole drills, the same may also be used in other drills at which it is desirable to generate short chips.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert comprising:
    a top side;
    a cutting edge for cutting a chip;
    a chip removing surface disposed behind the cutting edge and curving generally concavely upwardly to the top side to form a ridge therewith, the chip removing surface arranged to form a curvature in the chip as the chip becomes elongated; and at least one chip-embossing formation extending rearwardly along the chip removing surface in the direction of chip elongation, the formation having a length in the rearward direction that is substantially greater than a width of the formation, the formation extending to the top side to produce a narrow embossment in an underside of the chip in the direction of chip elongation to stiffen the chip.

2. The cutting insert according to claim 1 wherein the embossment extends rearwardly past the ridge.

3. The cutting insert according to claim 1 wherein the formation comprises a groove configured to produce an embossment in the form of a ridge in the chip underside.

4. The cutting insert according to claim 1 wherein the groove has a depth of at least 0.05 mm.

5. The cutting insert according to claim 4 wherein the depth is at least 0.08 mm.

6. The cutting insert according to claim 4 wherein the depth is no greater than 0.15 mm.

7. The cutting insert according to claim 6 wherein the depth is no greater than 0.12 mm.

8. The cutting insert according to claim 3 wherein the depth is no greater than 0.15 mm.

9. The cutting insert according to claim 8 wherein the depth is no greater than 0.12 mm.

10. The cutting insert according to claim 4 wherein the groove has a width in the range 0.10–0.30 mm.

11. The cutting insert according to claim 3 wherein the groove includes a main portion that branches off into partial grooves at a front end thereof adjacent the cutting edge, wherein the partial grooves are directed in respective directions toward the cutting edge.

12. The cutting insert according to claim 11 wherein a rear end of the groove forms a countersink in the top side, the countersink being wider than the main portion of the groove.

13. The cutting insert according to claim 11 wherein the groove has a depth of at least 0.05 and no more than 0.15 mm.

14. The cutting insert according to claim 3 wherein the groove becomes widened at a rear end thereof, the widened rear end forming a countersink in the top side.

15. The cutting insert according to claim 1 wherein the embossment comprises at least one bead configured to produce an embossment in the form of a flute in the chip underside.

16. The cutting insert according to claim 15 wherein the bead has a height of at least 0.05 mm.

17. The cutting insert according to claim 16 wherein the height is at least 0.08 mm.

18. The cutting insert according to claim 17 wherein the height is no greater than 0.15 mm.

19. The cutting insert according to claim 16 wherein the height is no greater than 0.15 mm.

20. The cutting insert according to claim 19 wherein the height is no greater than 0.12 mm.

21. The cutting insert according to claim 16 wherein the bead has a width in the range 0.10–0.30 mm.

22. The cutting insert according to claim 1 wherein the at least one chip-embossing formation comprises a plurality of parallel formations.

23. A method of chip-forming drilling comprising the steps of:
   A) engaging a workpiece with a cutting edge of a cutting insert to cut a chip;
   B) guiding the cut chip rearwardly along a chip-removing surface of the insert and upwardly along a concavely curved rear portion of the chip removing surface to a ridge formed at an intersection of the curved portion and a top side of the insert; and
   C) producing at least one embossment in an underside of the chip as the chip travels along the chip removing surface, the embossment having a length in the direction of elongation that is substantially greater than a width of the embossment, the embossment being produced until the chip reaches the top side.

24. The method according to claim 23 wherein the embossment is in the form of a ridge.

25. The method according to claim 23 wherein the embossment is in the form of a flute.

* * * * *